US006801338B1

(12) United States Patent
Morimatsu

(10) Patent No.: US 6,801,338 B1
(45) Date of Patent: Oct. 5, 2004

(54) IMAGE DATA BINARY CODING METHOD

(75) Inventor: Hiroyuki Morimatsu, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 912 days.

(21) Appl. No.: 09/698,675

(22) Filed: Oct. 27, 2000

(30) Foreign Application Priority Data

Oct. 29, 1999 (JP) ............................................ 11-309318

(51) Int. Cl.$^7$ ............................ H04N 1/40; H04N 1/409
(52) U.S. Cl. ...................... 358/3.04; 358/3.26; 358/3.21
(58) Field of Search ............................... 358/3.03, 3.05, 358/3.04, 3.06, 1.9, 534, 3.26, 3.21, 3.24, 465; 382/252, 275

(56) References Cited

U.S. PATENT DOCUMENTS 5,029,226 A * 7/1991 Klein et al. .................. 382/275
5,361,142 A * 11/1994 Semasa ....................... 358/3.24

FOREIGN PATENT DOCUMENTS

EP 0 272 147 6/1988 ............ H04N/1/40

OTHER PUBLICATIONS

Search Report corresponding to application No. GB 0025915.0 dated Apr. 20, 2001.

* cited by examiner

Primary Examiner—Scott Rogers
(74) Attorney, Agent, or Firm—RatnerPrestia

(57) ABSTRACT

An image processing method is provided for reproducing multi-gradation image data in the form of a bi-gradation image as used particularly in a printer, a scanner, a copier, a facsimile, etc. The method comprises acknowledging a pixel arrangement around a target pixel through examining an on/off-state of each pixel of a binary form, calculating error correction data from the pixel arrangement, and carrying out a binary coding of multi-gradation image data. Accordingly, as the error data for a binary form of the multi-gradation image data is corrected depending on the density of its actual printed form, unstable artifacts generated in the reproduction of pixels can be suppressed during the binary coding.

4 Claims, 6 Drawing Sheets

FIG. 6

|   | *  | 7 |
|---|----|---|
| 1 | 5  | 3 |

IMAGE DATA BINARY CODING METHOD

FIELD OF THE INVENTION

The present invention relates to an image data binary coding method for use in a printer, a scanner, a copier, a facsimile, etc. for reproducing multi-gradation image data in the form of a bi-gradation image.

BACKGROUND OF THE INVENTION

An error diffusion method is well known for converting a multi-gradation image to a bi-gradation image.

FIG. 5 is a block diagram of a circuit for performing a conventional error diffusion method. Multi-gradation image data $D_0$ of a target pixel to be converted to bi-gradation image data is read from image memory 100; a γ-correction is performed, by reference to correction data stored in γ-correction ROM 101; the multi-gradation image data is transformed to multi-gradation image data pertinent to printing characteristics of an output device such as a printer. Multi-gradation image data D, after the γ-correction, is added with error correction E of the target pixel by adder 102 in error diffusion processing unit 107, and resultant output F is released as F=D+E.

Output F of the target pixel, added with error data E, is then compared with binary threshold Th by comparator 104. When F=>Th, comparator 104 releases a binary signal B of 1 (B=1). If F<Th, a binary signal of 0 (B=0) is released. From the binary signal from comparator 104, subtracter 106 determines binary coding error E' as E'=F−B'. When an input data has 256 levels of gradation (0 to 255), B' is given as B'=255B. When D=230 and Th=128, binary output B is 1 (B=1) and binary coding error E' is determined as $$E'=D-255B=230-255=-25$$

For application to each pixel data thereafter, binary coding error E' is weighted according to specific error matrix Mxy in weighting error calculator 105, and then, calculator 105 calculates error correction E and saves correction E in error memory 103. Adder 102 adds error correction E with succeeding multi-gradation pixel data, and the error diffuses.

In the above example, multi-gradation image data D of D=230 is compared with binary threshold Th of Th=128, and a resultant binary output is 1 at the level of 255 out of 256 levels. Then, a binary error of −25 is generated for multi-gradation image data D of 230. Weighting error calculator 105 weights and distributes the binary error to error memory 103 for adjacent pixels with the error matrix, and the error is reflected to the binary coding of the succeeding multi-gradation image data.

An example of error matrix Mxy used in the conventional error diffusion method is shown in FIG. 6. The pixel denoted by the symbol "*" is a target pixel to be subjected to the binary coding. An error generated during the binary coding of the target pixel is weighted according to the weighting factors of 7, 1, 5, and 3 shown in FIG. 6, and weighted errors are applied to the succeeding image data before the binary coding. For binary coding of the multi-gradation image data of the target pixel denoted by "*", the weighted error is read out from error memory 103 and used for correcting the image data received from image memory 100.

The conventional error diffusion method permits a binary error generated during the binary coding of pixel data to be applied to the succeeding pixel data that is subjected to the binary coding, hence minimizing the error between the bi-gradation image data and the original multi-gradation image data.

The binary image generated by the error diffusion method has a smoother gradation and a higher resolution than a binary image generated by a common dithering matrix method. Hence, the error diffusion method is preferably applied to an ink jet printer or the like and regarded as an essential method for achieving a higher quality level of printing.

When a binary image generated by the error diffusion method is printed down with a common electronic photographic apparatus, dots of a printed pattern appear unstable hence causing a shape of a particle to be significantly deteriorated and making the quality of a printed image unfavorable.

This may be derived from the fact that the pattern of dots particularly in lower density regions is printed in an unstable manner by the electronic photographic apparatus and a dot gain is thus poor, while any ink jet printer can successfully print down discrete dots of a pattern. Also, in intermediate or high density regions, the dots of ink may be saturated too quickly, hence a declining reproducing of a gradation.

Moreover, printing with an electronic photographic apparatus possibly causes adjacent dots to overlap each other thus creating undesirably large dots. This may generate variations in the density throughout the regions at the same density, deteriorating the particles of dots.

Because of the above described aspects, the error diffusion method is not desirably applicable to the binary coding for an electronic photographic apparatus which produces a pattern of dots in an unstable manner in the reproduction. Yet, the error diffusion method is advantageous as higher in the smoothness of gradation and the resolution than the dithering methods. In a case that the error diffusion method is successfully used for binary coding with any electronic photographic apparatus, a resultant reproduced image will significantly be improved.

SUMMARY OF THE INVENTION

An image data binary coding method is provided for subjecting a pixel of a multi-gradation image to binary coding to generate a binary or bi-gradation image, which comprises acknowledging an arrangement of pixels around a target pixel through examining an on/off-state of each pixel of a binary form, calculating error correction data from the pixel arrangement, and carrying out the binary coding for multi-gradation image data.

As the error data for a binary form of the multi-gradation image data is corrected depending on a density of its actual printed form, unstable artifacts generated in the reproduction of printed dots can be suppressed during the binary coding. The bi-gradation image data processed by the error diffusion method can hence favorably be printed in dots.

BRIEF DESCRIPTION OF THE DRAWINGS

FIG. 6 is a diagram showing an error matrix according to the conventional error diffusion method.

DESCRIPTION OF THE PREFERRED EMBODIMENT

The preferred embodiment of the present invention will be described referring to FIGS. 1 through 4.

Figure 1:
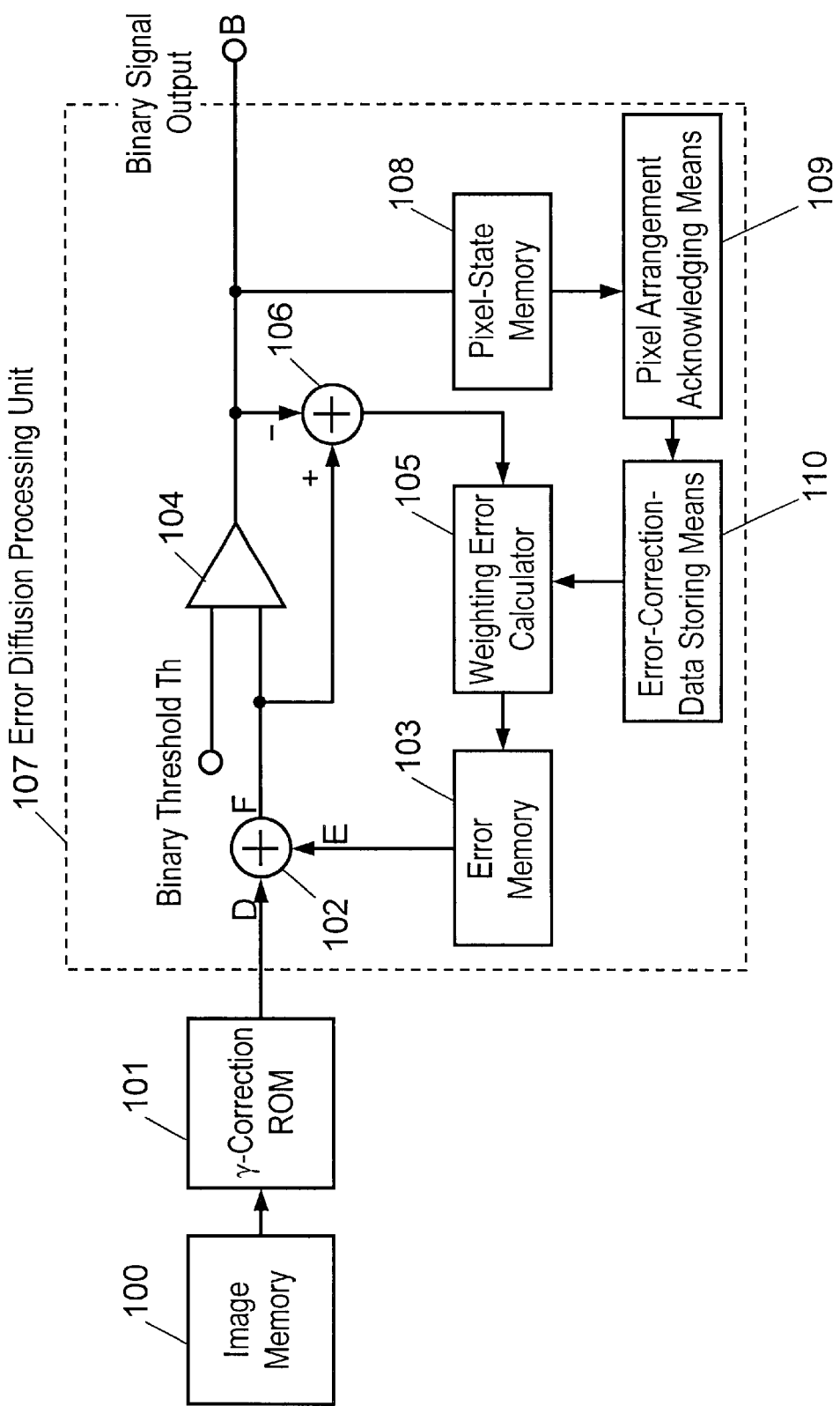
FIG. 1 is a block diagram showing a circuit of an image data binary coding apparatus for implementing an image data binary coding method of an embodiment of the present invention.
Figure 2A:
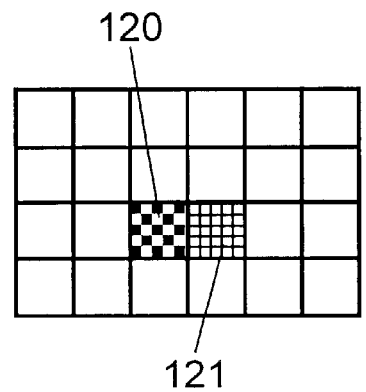
FIG. 2 is a diagram showing a pixel arrangement according to the image data binary coding method of an embodiment of the present invention.
Figure 2B:
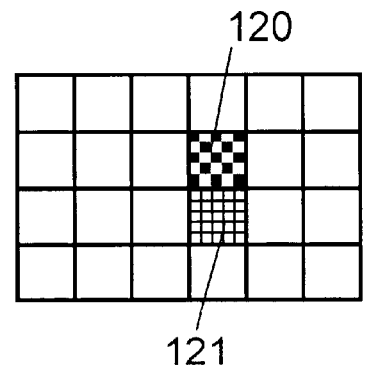
Figure 2C:
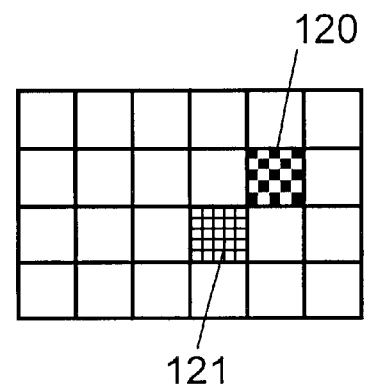
Figure 2D:
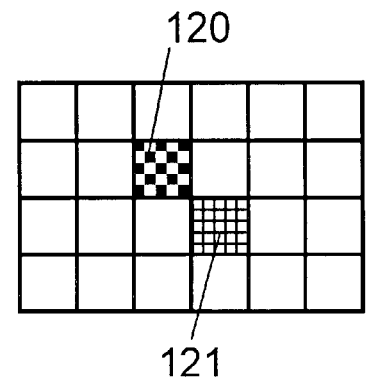
Figure 3:
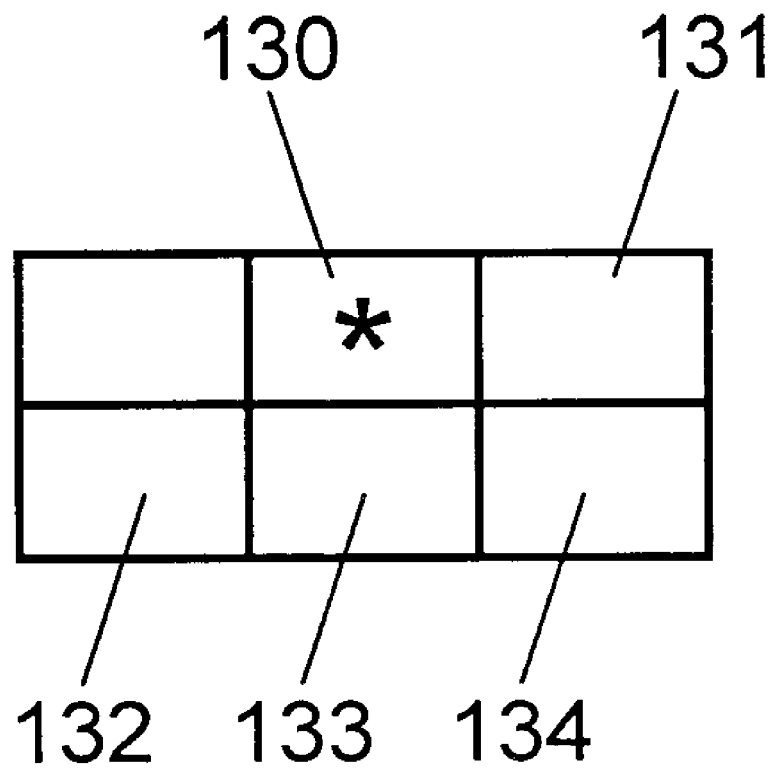
FIG. 3 is a diagram showing an array of error diffused pixels around a target pixel according to the image data binary coding method of an embodiment of the present invention.
Figure 4:
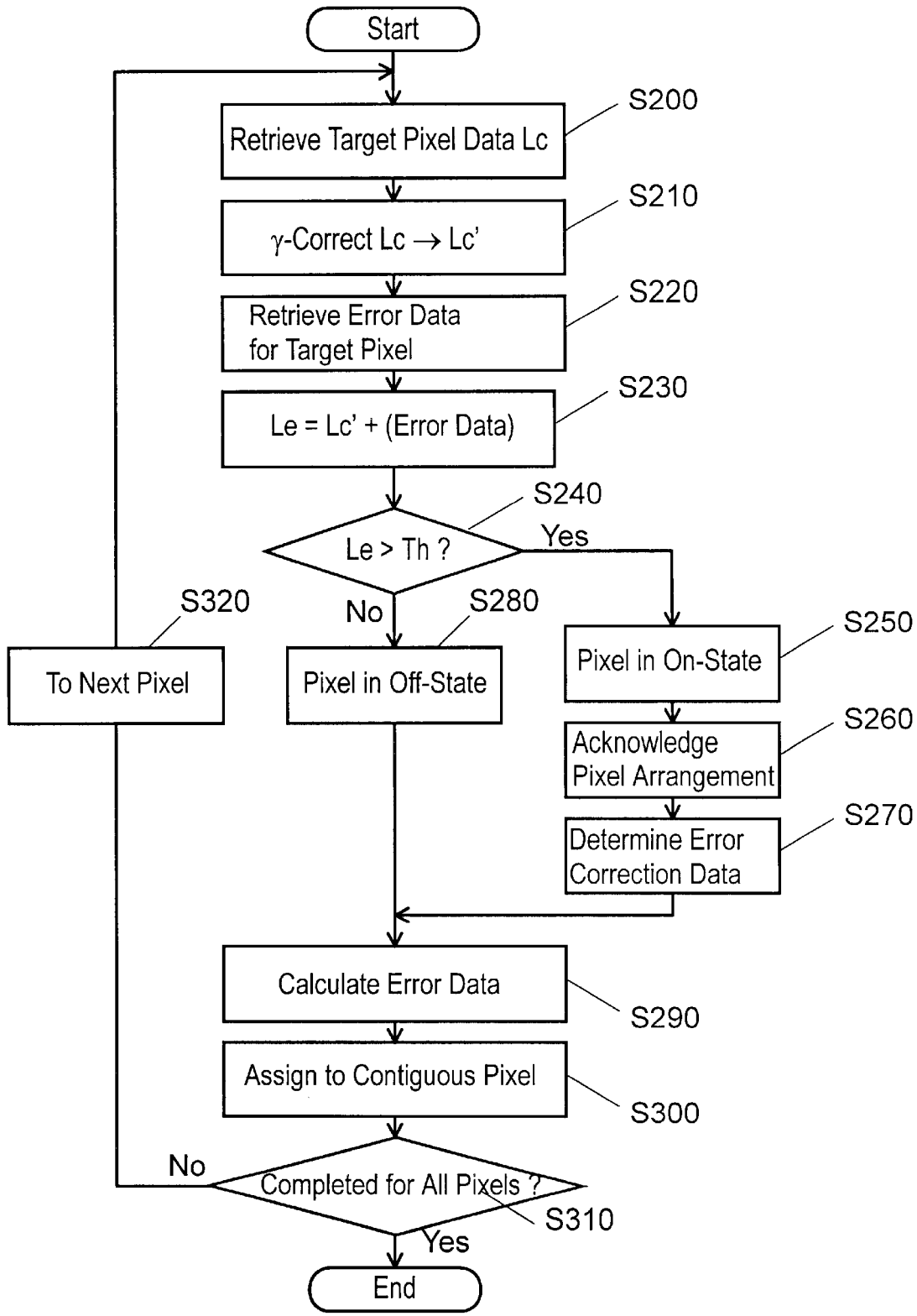
FIG. 4 is a flowchart showing a procedure of performing the image data binary coding method of the embodiment of an present invention.
Figure 5:
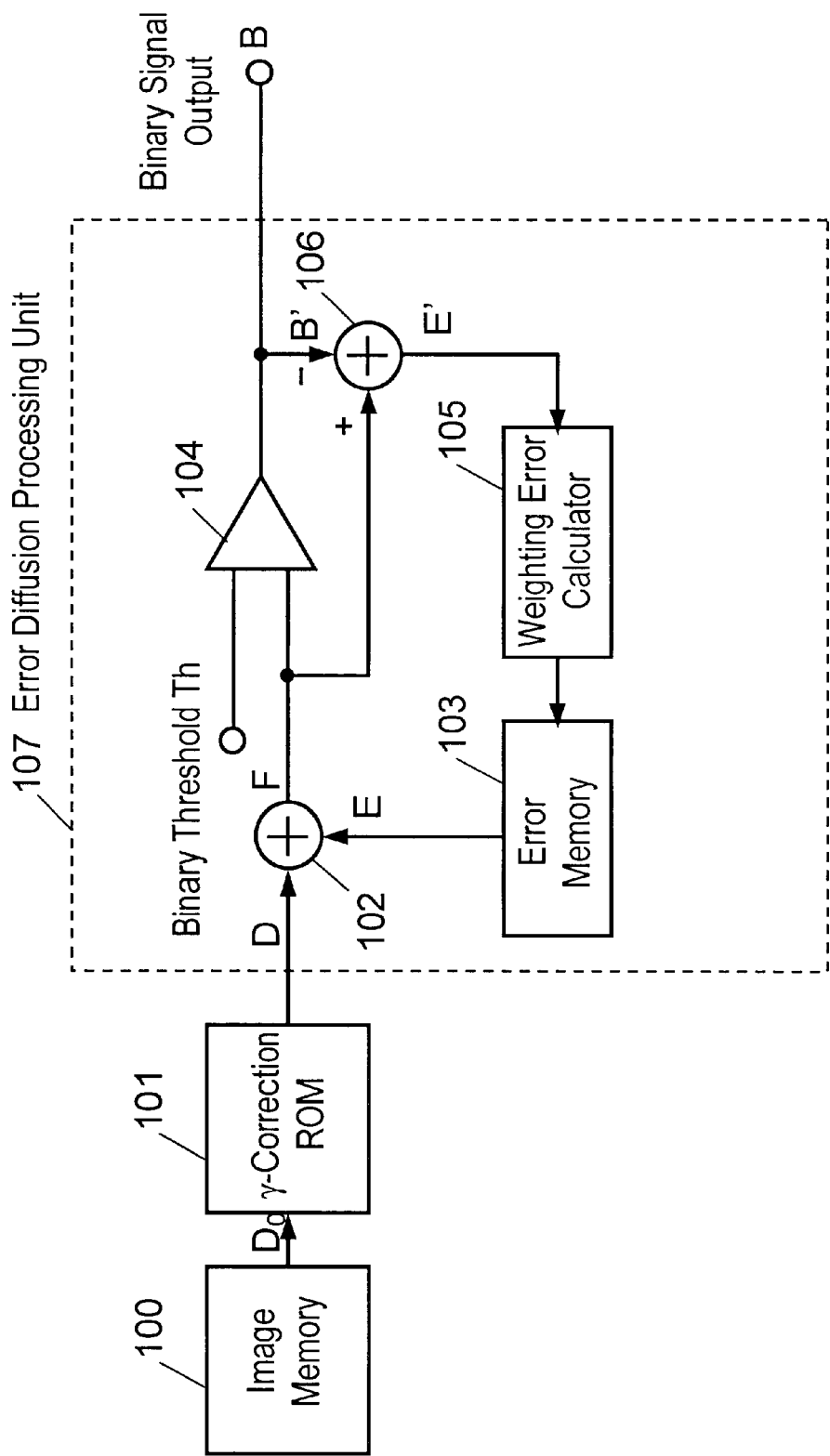
FIG. 5 is a block diagram showing a circuit for carrying out a conventional error diffusion method.

FIG. 1 is a block diagram showing a circuit of an image data binary coding apparatus for implementing an image data binary coding method of an embodiment of the present invention. FIG. 2 is a diagram showing a pixel arrangement according to the image data binary coding method of an embodiment of the present invention. FIG. 3 is a diagram showing an array of error diffused pixels around a target pixel according to the image data binary coding method of an embodiment of the present invention. FIG. 4 is a flowchart showing a procedure of performing the image data binary coding method of an embodiment of the present invention.

As shown in FIG. 1, the image data binary coding apparatus comprises:

(a) image memory 100 for storing multi-gradation image data of each target pixel to be subjected to the binary coding;

(b) γ-correction ROM 101 for γ-correcting the multi-gradation image data using correction data therein, so that the multi-gradation image data is pertinent data to printing characteristics of an output device such as a printer; and (c) error diffusion processing unit 107 for error-diffusion-processing and converting the γ-corrected multi-gradation image data into binary data.

Error-diffusion-processing unit 107 comprises:

(1) adder 102 for summing the γ-corrected multi-gradation image data and an error data stored in error memory 103;

(2) comparator 104 for comparing the error added image data with binary threshold Th to determine a binary output signal;

(3) subtracter 106 for calculating a binary coding error used for the binary coding from a binary output of comparator 104 and an image data output of adder 102;

(4) weighting-error calculating unit 105 for weighting the binary coding error according to error matrix Mxy;

(5) error memory 103 for storing the weighted error data;

(6) pixel-state memory 108 for storing an on/off-state of each pixel which represents a binary output signal of comparator 104;

(7) pixel-arrangement acknowledging means 109 for acknowledging a pixel arrangement from a state of pixels around a target pixel, the state identified by referring to an on/off-state of pixels just in front of and at the left (or right) of the target pixel which are stored in pixel-state memory 108; and (8) error-correction-data storing means 110 for supplying error correction data, which corresponds to the pixel arrangement received from pixel-arrangement acknowledging means 109, to weighting-error calculating unit 105.

Using the error correction data received from error-correction-data storing means 110, weighting-error calculating unit 105 corrects an error for data at the target pixel and delivers the corrected error to error memory 103.

The image data binary coding method of the present invention implemented on the image data binary coding apparatus will now be described in detail.

The binary coding method includes retrieving density data of a target pixel from image memory 100, γ-correcting the density data of the target pixel using density correction data stored in γ-correction ROM 101, and summing the corrected data and an error data stored in error memory 103. The calculation of the error data stored in error memory 103 will be explained later.

Comparator 104 compares the density data of the target pixel accompanied with the error data with threshold data Th for the binary coding, to determine a bi-gradation output, i.e., an on/off-state of the target pixel. While the bi-gradation output is released as a binary signal from the apparatus, the output is also held as an on/off-state in pixel-state memory 108. When the target pixel is in an on-state, a pixel arrangement including the target pixel is acknowledged by pixel-arrangement acknowledging means 109 for generating an error-correction data pertinent to the pixel arrangement.

FIGS. 2(a) through 2(d) illustrate examples of the pixel arrangements for error correction.

As shown in FIG. 2, the state of each pixel 120 after the binary coding can be retrieved from pixel-state memory 108. It is now assumed in this embodiment that target pixel 121 is binary-coded through comparator 104 and is judged as in the on-state. When theoretical density of each pixel is D and the actual levels of density are Da, Db, Dc, and Dd in the arrangement, error correction values Ea, Eb, Ec, and Ed of the actual levels are:

$$Ea=Da/2-D;$$

$$Eb=Db/2-D;$$

$$Ec=Dc/2-D; \text{ and}$$

$$Ed=Dd/2-D.$$

Error correction value E1 of an isolated pixel in an array unlike those shown in FIGS. 2(a) through 2(d) is calculated from a printed density of D1, $$E1=D1-D.$$

In a photographic apparatus, the isolated pixel with no contiguous pixels is generally printed in a lower level of density than the theoretical level, and the error correction value E1 is hence negative.

The error correction value may be varied even on the same printing apparatus depending on the individuals. This can properly be compensated by calculating an average of the error correction data from the measurements on plural apparatuses.

While the error correction values are stored in error-correction-data storing means 110, one of them selected in response to the pixel-arrangement acknowledged by pixel-arrangement acknowledging means 109 is then supplied to weighting-error calculating unit 105.

In an electronic photographic apparatus for printing in full four colors, cyan (C), magenta (M), yellow (Y), and black (K) which are different in printed characteristics, error correction values for C, M, Y, and K colors respectively are determined and stored in error-correction-data storing means 110. As the error correction values are applied for each color, the printing in the full colors C, M, Y, and K can favorably be corrected.

While the above description is based on one pixel adjacent to the target pixel, two or three pixels around the target pixel or any pixel not adjacent to the target pixel may be calculated for their respective error correction values which are then stored in error-correction-data storing means 110. As the error correction data pertinent to the pixel arrangements is abundant, the error correction may be carried out more precisely.

Weighting-error calculation unit 105 receives the error correction data from error-correction-data storing means 110 and determines the corrected error data.

The operation of determining error diffusion for the contiguous pixels from the corrected error data will be explained referring to FIG. 3.

FIG. 3 illustrates target pixel 130 in a binary form and contiguous pixels 131, 132, 133, and 134 for error diffusion.

Figure 6:
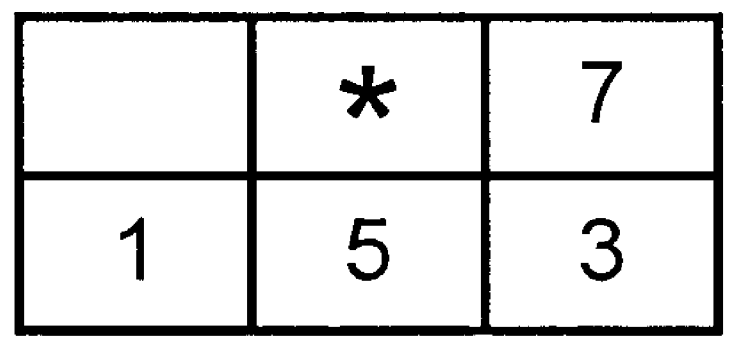

It is assumed that the density of target pixel 130 in an original image is Lc, the error correction value received from error-correction-data storing means 110 is E, and a range of the density levels in the original image is L. Diffused error values E1, E2, E3, and E4 at contiguous pixels 131, 132, 133, and 134 respectively are calculated from error diffusion factors shown in FIG. 6, $E1 = (Lc - (L+E)) * 7/16;$ $E2 = (Lc - (L+E)) * 1/16;$ $E3 = (Lc - (L+E)) * 5/16;$ and $E4 = (Lc - (L+E)) * 3/16.$ The calculated error data is then transferred to error memory 103 and added to the stored error data of the same pixels for use in the binary coding of the succeeding pixels.

A procedure of overall operations of the present invention will be described referring to the flowchart shown in FIG. 4.

As shown in FIG. 4, the procedure starts with retrieving multi-gradation image data of a target pixel in an original image (Step S200) and subjecting the multi-gradation image data to the γ-correction in γ-correction ROM (Step S210).

This is followed by retrieving the error data for the target pixel (Step S220) and combining the error data and the γ-corrected data (Step S230).

Then, error data Le of the target pixel after added and γ-corrected is compared with binary coding threshold Th (Step S240).

When Le>Th, it is judged that the target pixel of binary form is in an on-state (Step S250) and a pixel arrangement around the target pixel is acknowledged (Step S260). This is followed by determining the error correction data pertinent to the acknowledged pixel arrangement (Step S270) and calculating the error data from the error correction data (Step S290).

When Le<Th at Step S240, it is judged that the target pixel of binary form is in an off-state (step S280), and the error data is calculated from data Le of the target pixel (Step S290).

The error data calculated at Step S290 are assigned to the pixels which are adjacent to the target pixel according to the error diffusion factors and stored in the error memory for future use (Step S300).

The above steps have been repeated for all the pixels in the original image, and the procedure is then terminated (Steps S310 and S320).

As set forth above, the apparatus of the present invention is adapted to correct the error data used for the binary coding of a multi-gradation image data, depending on an actual density of printed form. Therefore, unstable artifacts in the reproduction of pixels can be suppressed during the binary coding. Also, as the apparatus employs the error diffusion method, binary image data can explicitly be reproduced in the printed form.

What is claimed is:

1. An image data binary coding method for binary coding a target pixel of a multi-gradation image to generate a bi-gradation image, comprising:

(a) determining whether said target pixel is in an on state or an off state;

(b) identifying a pixel arrangement around said target pixel under a condition of an actual printing density based on the result of said step (a);

(c) calculating a correction for a density of the target pixel based on the results of said step (b); and (d) binary coding the target pixel using the correction.

2. An image data binary coding method according to claim 1, wherein step (c) includes the step of assigning a negative value to the correction when the target pixel is isolated.

3. An image data binary coding method for binary coding a target pixel of a multi-gradation image to generate a bi-gradation image, comprising the steps of:

(a) determining whether said target pixel is in an on state or an off state;

(b) identifying a pixel arrangement around said target pixel under an condition of an actual printing density based on said step (a);

(c) calculating a first correction for a density of the target pixel based on the results of said step (b);

(d) performing said (a) determining, (b) identifying, and (c) calculating for a plurality of multi-gradation images and calculating a second correction by averaging a plurality of the first corrections; and (e) binary coding the target pixel using the second correction.

4. An image data binary coding method according to claim 3, wherein said step (c) includes the step of assigning a negative value to the first correction when the target pixel is isolated.

* * * * *